United States Patent
Suba et al.

(10) Patent No.: US 11,044,620 B2
(45) Date of Patent: Jun. 22, 2021

(54) DETERMINING LOCATION-BASED WIRELESS CONNECTION QUALITY FOR INTENT-BASED APPLICATIONS BASED ON AGGREGATING DETERMINED DEVICE SESSION INTERRUPTIONS

(71) Applicant: Cisco Technology, Inc., San Jose, CA (US)

(72) Inventors: Vimal Narotamdas Suba, Fremont, CA (US); Sai Kiran Reddy Malikireddy, Santa Clara, CA (US); Bipinkumar Reddy Algubelli, San Ramon, CA (US); Chandra Sekhar Veluru, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 44 days.

(21) Appl. No.: 16/660,551

(22) Filed: Oct. 22, 2019

(65) Prior Publication Data

US 2021/0120439 A1    Apr. 22, 2021

(51) Int. Cl.
*H04W 24/08* (2009.01)
*H04L 12/26* (2006.01)
(Continued)

(52) U.S. Cl.
CPC ......... *H04W 24/08* (2013.01); *H04L 43/0811* (2013.01); *H04M 3/2218* (2013.01); *H04W 64/006* (2013.01)

(58) Field of Classification Search
CPC . H04W 24/08; H04W 64/006; H04L 43/0811; H04M 3/2218
See application file for complete search history.

(56) References Cited

U.S. PATENT DOCUMENTS 9,295,082 B2    3/2016  Sennett et al.
10,009,730 B2*  6/2018  Donovan ............... H04W 8/22
(Continued)

FOREIGN PATENT DOCUMENTS

WO    2019034805 A1    2/2019

OTHER PUBLICATIONS

Moradi et al., "Optimizing DRX for Video delivery over LTE: Utilizing Channel Prediction and In-Network Caching", The 2017 International Workshop on Service-oriented Optimization of Green Mobile Networks (GREENNET), [online], [retrieved on Jun. 19, 2019]. Retrieved from the Internet: URL: <https://www.scribd.com/document/352644482/Optimizing-DRX-for-Video-delivery-over-LT>, 6 pages.

(Continued)

*Primary Examiner* — Hashim S Bhatti
(74) *Attorney, Agent, or Firm* — Leon R. Turkevich (57) ABSTRACT

In one embodiment, a method comprises: determining, by a network device, a time gap between first and second wireless sessions by a mobile network device in an identified wireless region of a wireless cellular data network, based on first detecting an abnormal closing of the first wireless session based on a first call data record (CDR) generated based on data from a packet gateway (PGW), and second detecting an opening of the second wireless session consecutively following the first wireless session based on a second CDR generated based on data from the PGW; aggregating time gaps for respective first and second wireless sessions; generating a time-based connection quality score for the identified wireless region based on the time gaps; and causing a second mobile network device destined for the identified wireless region to mitigate against poor connection quality in the identified wireless region based on the time-based connection quality score.

20 Claims, 9 Drawing Sheets

(51) Int. Cl.
  *H04W 64/00* (2009.01)
  *H04M 3/22* (2006.01)

(56) References Cited

U.S. PATENT DOCUMENTS

| | | | |
|---|---|---|---|
| 10,567,245 B1 * | 2/2020 | Patil | ............... H04W 24/08 |
| 2018/0191867 A1 | 7/2018 | Siebel et al. | |
| 2018/0198924 A1 | 7/2018 | Kovacs et al. | |
| 2018/0205802 A1 | 7/2018 | Bowen | |

OTHER PUBLICATIONS

Lin et al., "Performance and Implications of RAN Caching in LTE Mobile Networks: a Real Traffic Analysis", IEEE 2016, [online], [retrieved on Jun. 19, 2019]. Retrieved from the Internet: URL: <http://www.cs.ucr.edu/~jiasi/pub/caching_secon16.pdf>, 9 pages.

Woo et al., "Comparison of Caching Strategies in Modern Cellular Backhaul Networks", MobiSys '13, Jun. 25-28, 2013, [online], [retrieved on Jun. 19, 2019]. Retrieved from the Internet: URL: <http://www.ndsl.kaist.edu/~kyoungsoo/papers/mobisys13_woo.pdf>, 14 pages.

Nam et al., "Towards A Dynamic QoS-aware Over-The-Top Video Streaming in LTE", [online], [retrieved on Jun. 19, 2019]. Retrieved from the Internet: <URL: <https://pdfs.semanticscholar.org/0338/0fc7f6e74fd8b97ce7a8518eff5722fe385c.pdf?_ga=2.221560024.1578130665.1548778722-1119438951.1548778722>, 9 pages.

Radio.co, "Internet Radio Bandwidth Calculator", [online], [retrieved on Jun. 19, 2019]. Retrieved from the Internet: URL: <https://radio.co/internet-radio-bandwidth-calculator>, pp. 1-5.

Vu et al., "Edge-Caching Wireless Networks: Performance Analysis and Optimization", IEEE Wireless Commun., vol. X, 2018, [online], [retrieved on Jun. 19, 2019]. Retrieved from the Internet: URL: <http://orbilu.uni.lu/bitstream/10993/35058/1/TWC18Orbi.pdf>, 13 pages.

Toolstudio.io, "Video bitrate calculator", [online], [retrieved on Jun. 19, 2019]. Retrieved from the Internet: URL: <https://toolstud.io/video/bitrate.php>, 3 pages.

Cunningham et al., U.S. Appl. No. 16/104,810, filed Aug. 17, 2018.

* cited by examiner

FIG. 1

| NoramlizedRecordID | CDR-ID | IMSI | CDR-OPENTIME | CDR-CLOSETIME | USAGE |
|---|---|---|---|---|---|
| CARRIERID | ROUNDEDUSAGE | SIMID | SIMSTATUS | ACCTID | OPERATORID |
| RATEPLANID | BILLABLE | CARRIERGROUPID | RAWGTPRECORDID | CHARGINGID | GGSNADDR |
| SGSNADDR | RECORDSEQNUMB | BYTESUPLINK | SERVEDPDPADDR | CAUSERECORDCLOSING | APN |
| DURATION | BYTESDOWNLINK | IMEI | RATINGGROUPID | USERLOCATIONINFORMATION | RATTYPE |
| TIMEOFFIRSTUSAGE | TIMEOFLASTUSAGE | TIMEUSAGE | ...more... | | |

Device 1 session data for CELLID1

| Time Code | Time | Session | Record Sequence | Session Termination | Tags* |
|---|---|---|---|---|---|
| t1 | 07:15:52:123PM | S1 | 0 | | 7-8PM, Saturday, Sophisticated |
| t2 | 07:23:41:542PM | S1 | 1 | Abnormal | |
| t3 | 07:23:43:542PM | S2 | 0 | | |
| t4 | 07:27:43.345 | S2 | 1 | Normal | |

Device 2 session data for CELLID1

| 1 | Time | Session | Record Sequence | Session Termination | Tags* |
|---|---|---|---|---|---|
| t3 | 07:33:52:00PM | S21 | 0 | | 7-8PM, Saturday, Simple |
| t4 | 07:35:53:00PM | S21 | 1 | Abnormal | |
| t5 | 07:35:54:00 PM | S22 | 0 | | 7-8PM, Saturday, Simple |
| t6 | 07:35:57.345 | S22 | 1 | | |
| t7 | 07:35:59.345 | S22 | 2 | Normal | |

○○○ Observations for M sessions within CELLID1 across N devices

○○○ Observations across CELLID1....CELLIDXX

DETERMINING LOCATION-BASED WIRELESS CONNECTION QUALITY FOR INTENT-BASED APPLICATIONS BASED ON AGGREGATING DETERMINED DEVICE SESSION INTERRUPTIONS

TECHNICAL FIELD

The present disclosure generally relates to determining a location-based wireless connection quality for intent-based applications based on aggregating determined device session interruptions.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Growth in use of cellular-connected mobile network devices (e.g., Connected Cars, Connected Vehicles, Connected Trains, Connected Buses and other connected mobile devices such as Internet of Things (IoT) devices, smart phone/smart tablet devices, etc.) create increased demand for wireless cellular data network providers to consistently maintain high levels of Quality of Service (QoS), enabling delivery of real-time ("streaming") wireless data to a user device at expected QoS levels for a consistent and satisfactory user experience via the user device.

A problem in consistent delivery of wireless data to a user device is that wireless regions of a wireless cellular data network invariably suffer from transient adverse factors (weather, geography, building structures, changes in number of active users and user demand, user mobility, etc.); hence, even an intermittent reduction in the QoS delivery of streaming data as a user device passes through one or more "blind spots" in a given wireless region can result in an interruption of a wireless session, thereby frustrating an expected user experience via the user device.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises: determining, by a network device, a time gap between first and second wireless sessions by a mobile network device in an identified wireless region of a wireless cellular data network, the time gap determined based on first detecting an abnormal closing of the first wireless session based on a first call data record (CDR) generated based on data from a packet gateway (PGW) associated with the wireless cellular data network, and second detecting an opening of the second wireless session consecutively following the first wireless session based on a second CDR generated based on data from the PGW; aggregating, by the network device, a plurality of the time gaps for respective first and second wireless sessions by one or more of the mobile network devices in the identified wireless region; generating and storing, by the network device, a time-based connection quality score for the identified wireless region based on the time gaps; and causing, by the network device, a second mobile network device destined for the identified wireless region to mitigate against poor connection quality in the identified wireless region based on the time-based connection quality score and prior to entry of the second mobile network devices into the identified wireless region.

In another embodiment, an apparatus comprises non-transitory machine readable media configured for storing executable machine readable code, a device interface circuit, and a processor circuit. The device interface circuit is configured for retrieving data from a packet gateway (PGW) associated with a wireless cellular data network. The processor circuit is configured for executing the machine readable code, and when executing the machine readable code operable for: determining a time gap between first and second wireless sessions by a mobile network device in an identified wireless region of a wireless cellular data network, the time gap determined based on first detecting an abnormal closing of the first wireless session based on a first call data record (CDR) generated based on data from the PGW, and second detecting an opening of the second wireless session consecutively following the first wireless session based on a second CDR generated based on data from the PGW; aggregating a plurality of the time gaps for respective first and second wireless sessions by one or more of the mobile network devices in the identified wireless region; generating and storing a time-based connection quality score for the identified wireless region based on the time gaps, and causing a second mobile network device destined for the identified wireless region to mitigate against poor connection quality in the identified wireless region based on the time-based connection quality score and prior to entry of the second mobile network devices into the identified wireless region.

In another embodiment, one or more non-transitory tangible media are encoded with logic for execution by a machine and when executed by the machine operable for: determining, by the machine implemented as a network device, a time gap between first and second wireless sessions by a mobile network device in an identified wireless region of a wireless cellular data network, the time gap determined based on first detecting an abnormal closing of the first wireless session based on a first call data record (CDR) generated based on data from a packet gateway (PGW) associated with the wireless cellular data network, and second detecting an opening of the second wireless session consecutively following the first wireless session based on a second CDR generated based on data from the PGW; aggregating, by the network device, a plurality of the time gaps for respective first and second wireless sessions by one or more of the mobile network devices in the identified wireless region; generating and storing, by the network device, a time-based connection quality score for the identified wireless region based on the time gaps; and causing, by the network device, a second mobile network device destined for the identified wireless region to mitigate against poor connection quality in the identified wireless region based on the time-based connection quality score and prior to entry of the second mobile network devices into the identified wireless region.

DETAILED DESCRIPTION

Particular embodiments enable dynamic monitoring and prediction of various conditions, operations, activities, etc., that affect the relative ability of an identified wireless region in a wireless cellular data region to provide wireless streaming data to a wireless mobile network device at a sufficient Quality of Service (QoS) level as to satisfy the Quality of Experience (QoE) expectation provided by an executable application (e.g., "App") processing the wireless streaming data for presentation to a user of a the wireless mobile network device. The QoE expectation (i.e., QoE requirement) is distinct from a QoS level in that the QoS level refers to the delivery of wireless data to a wireless mobile network device, whereas the QoE expectation is based on execution context within the wireless mobile network device, including number of executable applications ("apps") concurrently being executed, the relative QoS requirements for each of the streams consumed by the concurrently-executed applications (video vs. concurrent audio vs. concurrent browser updates, etc.), the relative capabilities of the wireless mobile network device (e.g., processing capacity, memory capacity, power capacity, etc.).

The example embodiments can provide a context-based prediction of the expected connection quality, in an identified wireless cellular data region, for a user device that is destined to enter the identified wireless cellular data region; the example embodiments also can determine if the expected connection quality in an identified wireless cellular data region will be satisfactory for an identifiable QoE expectation for the executable application executed in the wireless mobile network device and providing the streaming data.

The example embodiments also can selectively cause the wireless mobile network device, destined for the identified wireless region, to mitigate against poor connection quality in the identified wireless region based on, for example, sending an instruction to the wireless mobile network device within an existing wireless region of the wireless cellular data network and prior to entry in the identified wireless region.

Hence, the example embodiments enable a determination of a location-based connection quality for different wireless regions of a wireless cellular data network, in a manner that provides sufficient context for intent-based applications relying on predictive analytics to ensure a guaranteed QoE for a user.

Figure 1:
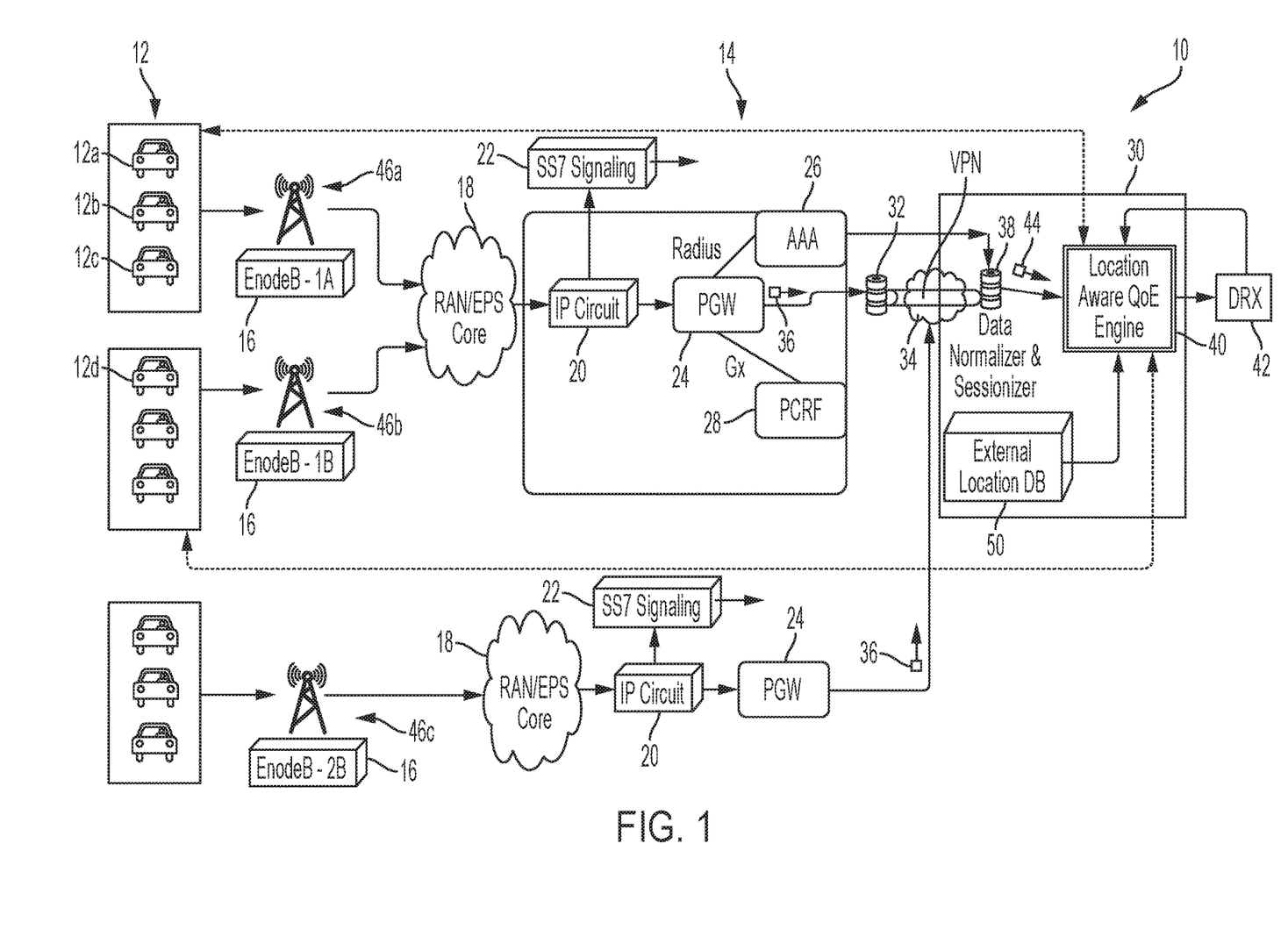
FIG. 1 illustrates an example system having an apparatus for generating location-based wireless connection quality scores for identified wireless regions of a wireless cellular data network, based on determined wireless session interruptions, for mitigation against poor connection quality by mobile network devices prior to entry in an identified wireless region, according to an example embodiment.

FIG. 1 illustrates an example data network 10 comprising wireless mobile network devices (e.g., Internet of Things (IoT) devices, digital wireless telephony devices, etc.) 12 in communications with a wireless cellular data network 14, according to an example embodiment. The wireless cellular data network 14 comprises cellular base stations 16 that are distributed throughout the wireless cellular data network 14 at respective identified wireless regions 46 of the wireless cellular data network 14. The cellular base stations 16 can be distributed based on geography, wireless propagation characteristics, terrestrial characteristics (terrain, building structures, etc.). The wireless cellular data network 14 also comprises a radio access network (RAN) 18, implemented for example as an Evolved Packet System (EPS) core in a $3^{rd}$ Generation Partnership Project (3GPP) Long Term Evolution (LTE) based wireless cellular data network or other network (e.g., 3G/4G/LTE/5G, etc.).

The wireless cellular data network 14 also can include an Internet Protocol (IP) Gateway circuit 20, an SS7 interface circuit 22, a Packet Data Network Gateway (PGW) 24, an Authentication, Authorization, and Accounting (AAA) server device 26 executing Remote Authentication Dial-in User Service (RADIUS), and a Policy and Charging Rules Function (PCRF) device 28 configured for executing policy and rules management in the wireless cellular data network 14. The PGW 24 (implemented, for example, using a commercially-available Cisco® ASR 5000 series computing systems from Cisco Systems, San Jose, Calif.) provides an interface between an LTE network and other packet data networks such as IP-based networks such as the Internet and/or SIP-based IMS networks.

The data network 10 also includes a connection quality server device 30 configured for generating time-based connection quality scores for each of the identified wireless regions (46 of FIG. 3), described below. The connection quality server device 30 also can cause any one or more of the wireless mobile network devices 12 to mitigate against poor connection quality in an identified wireless region 46 based on the corresponding determined time-based connection quality, prior to the one or more wireless mobile network devices 12 entering into the identified wireless region 46.

In some embodiments, the wireless cellular data network 14 also can include a VPN gateway 32 configured for creating a Virtual Private Network (VPN) connection 34 between the PGW 24 and the connection quality server device 30.

Figure 3:
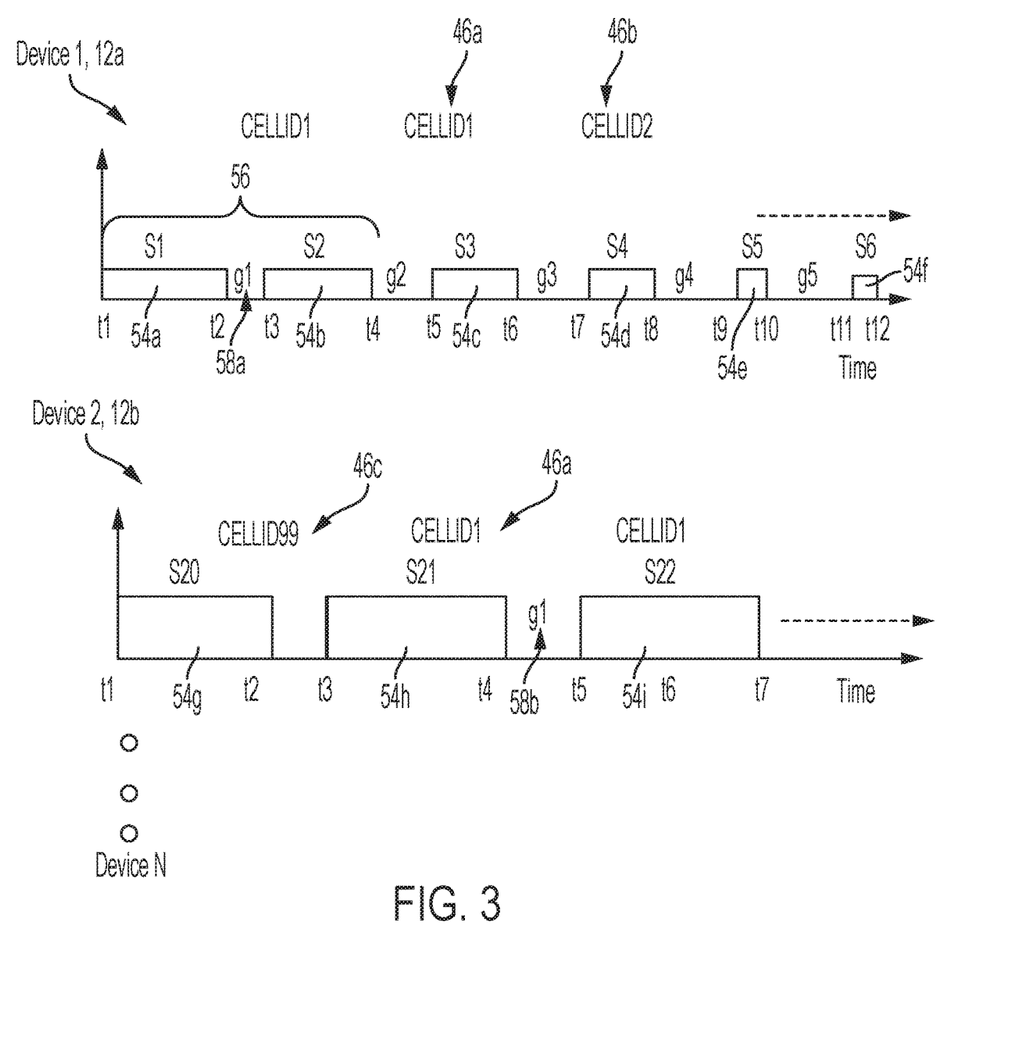
FIG. 3 illustrates the apparatus of FIG. 1 identifying time gaps caused by interruptions between consecutive wireless sessions attempted by one or more mobile network devices in an identified wireless region, according to an example embodiment.

As illustrated in FIGS. 1 and 3, the cellular base stations 16 are distributed around different identified wireless regions 46 in the wireless cellular data network 14; the connection quality server device 30 can retrieve data 36 from throughout the wireless cellular data network 14 and generate normalized call data records (CDR) 44 based on the data 36 output by one or more PGWs 24, where each CDR 44 identifies a corresponding wireless session 54 by an identified mobile network device 12.

The connection quality server device 30 includes a data normalizer and sessionizer circuit 38, and a location aware Quality of Experience (QoE) circuit ("engine") 40. The connection quality server device 30 can be implemented as a single network device that comprises the circuits 38, 40, as discrete or integral components within the connection quality server device 30; the connection quality server device 30 also can be implemented as a blade server or large-scale server system in a cloud computing-based (or fog computing-based) data center, where the data normalizer and sessionizer device 38, the QoE engine device 40, each are discrete devices that can communicate via link-layer and/or network-layer connections. Hence, the VPN gateway 32 can establish the VPN connection 34 between a PGW 24 and the connection quality server device 30, as appropriate. In one embodiment, the connection quality server device 30 can be implemented using a commercially-available Cisco® ASR 5000 series computing systems that is configured as described herein. As described below, the QoE engine device 40 can send information to other devices in the wireless cellular data network 14 for optimization of various functions performed therein (e.g., the QoE engine device 40 can supply relevant information to a local and/or optimization device 42 configured for optimizing Discontinuous Reception (DRX) functionality, e.g., conserving device battery life.).

As described below, the QoE engine device 40 is configured for generating, for each wireless region 46, a corresponding time-variant connection-quality score (CQS) that enables the QoE engine device 40 to determine, for any wireless mobile network device 12 in the data network 10 and destined for an identified wireless region 46 (e.g., 46b), a predicted connection quality for the identified wireless region 46 prior to entry of the wireless mobile network device 12 in the wireless region 46 (e.g. 46b), based on the determined attributes and requirements of the wireless mobile network device 12 (and associated "app" executed in the wireless mobile network device 12 and consuming the streaming data transmitted by the wireless region 46); hence, the QoE engine device 40 can respond to a determined prediction of poor connection quality in the identified wireless region 46 (e.g., 46b) by causing the wireless mobile network device 12 to mitigate against the predicted poor connection quality by pre-loading the streaming data, for example from an existing wireless region 46a in which the wireless mobile network device 12 is currently connected.

Figure 7:
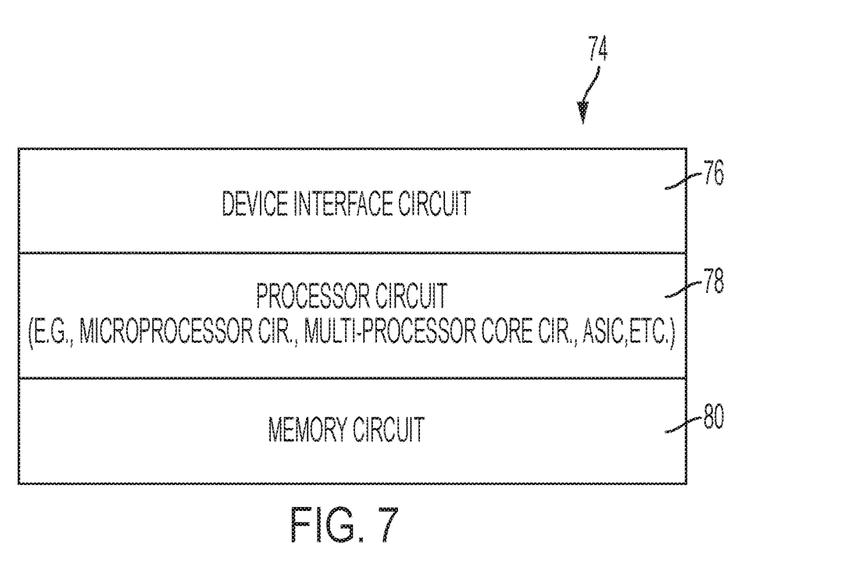
FIG. 7 illustrates an example implementation of any one of the devices of FIG. 1, according to an example embodiment.

FIG. 7 illustrates an example implementation 74 of any one of the devices 12, 16, 18, 20, 22, 24, 26, 28, 30, 32, 38, 40, 42, and/or 50 of FIG. 1, according to an example embodiment. The apparatus 74 of FIG. 7 is a physical machine (i.e., a hardware device) configured for implementing network communications with other physical machines via the network 10. The term "configured for" or "configured to" as used herein with respect to a specified operation refers to a device and/or machine that is physically constructed and arranged to perform the specified operation.

Hence, the apparatus of FIG. 7 is a network-enabled machine implementing network communications via the network 10.

Each apparatus 12, 16, 18, 20, 22, 24, 26, 28, 30, 32, 38, 40, 42, and/or 50 (as illustrated generally by the apparatus 74 of FIG. 7) can include a device interface circuit 76, a processor circuit 78, and a memory circuit 80. The device interface circuit 76 can include one or more distinct physical layer transceivers for communication with any one of the other devices 12, 16, 18, 20, 22, 24, 26, 28, 30, 32, 38, 40, 42, and/or 50; the device interface circuit 76 also can include an IEEE based Ethernet transceiver for communications with the devices of FIG. 1 via any type of data link (e.g., a wired or wireless link, an optical link, etc.). The processor circuit 78 can be configured for executing any of the operations described herein, and the memory circuit 80 can be configured for storing any data or data packets as described herein.

Any of the disclosed circuits of the devices 12, 16, 18, 20, 22, 24, 26, 28, 30, 32, 38, 40, 42, and/or 50 (including the device interface circuit 76, the processor circuit 78, the memory circuit 80, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 80) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 80 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/ packet on the communications medium, and storing the detected transmission as a data structure in a non-transitory tangible memory medium in the disclosed apparatus (e.g., in a receive buffer). Also note that the memory circuit 80 can be implemented dynamically by the processor circuit 78, for example based on memory address assignment and partitioning executed by the processor circuit 78.

Figure 8A:
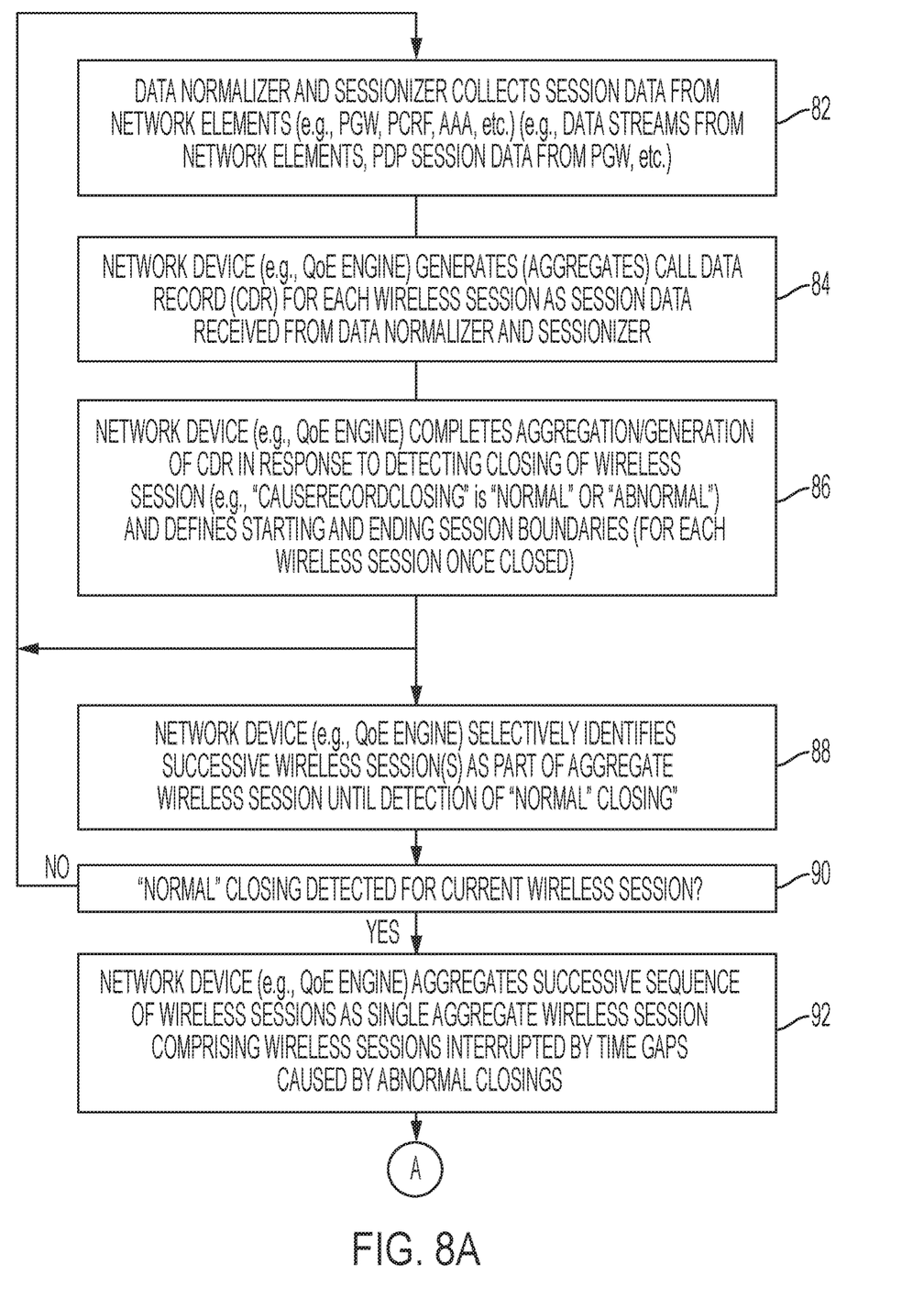
FIGS. 8A-8C illustrate an example method by the apparatus of FIG. 1 of generating location-based wireless connection quality scores for identified wireless regions of a wireless cellular data network, based on determined wireless session interruptions, for mitigation against poor connection quality by mobile network devices prior to entry in an identified wireless region, according to an example embodiment.
Figure 8B:
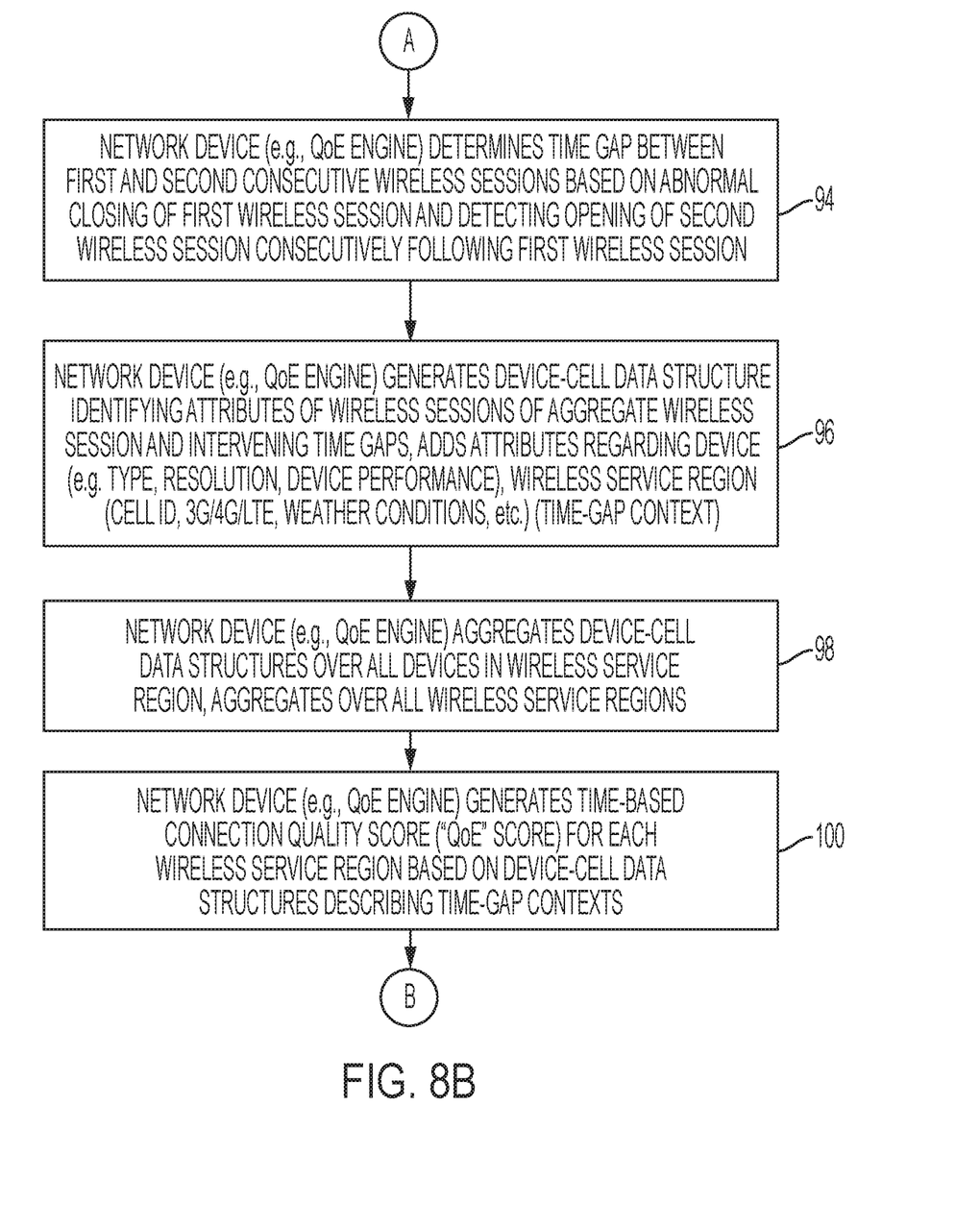
Figure 8C:
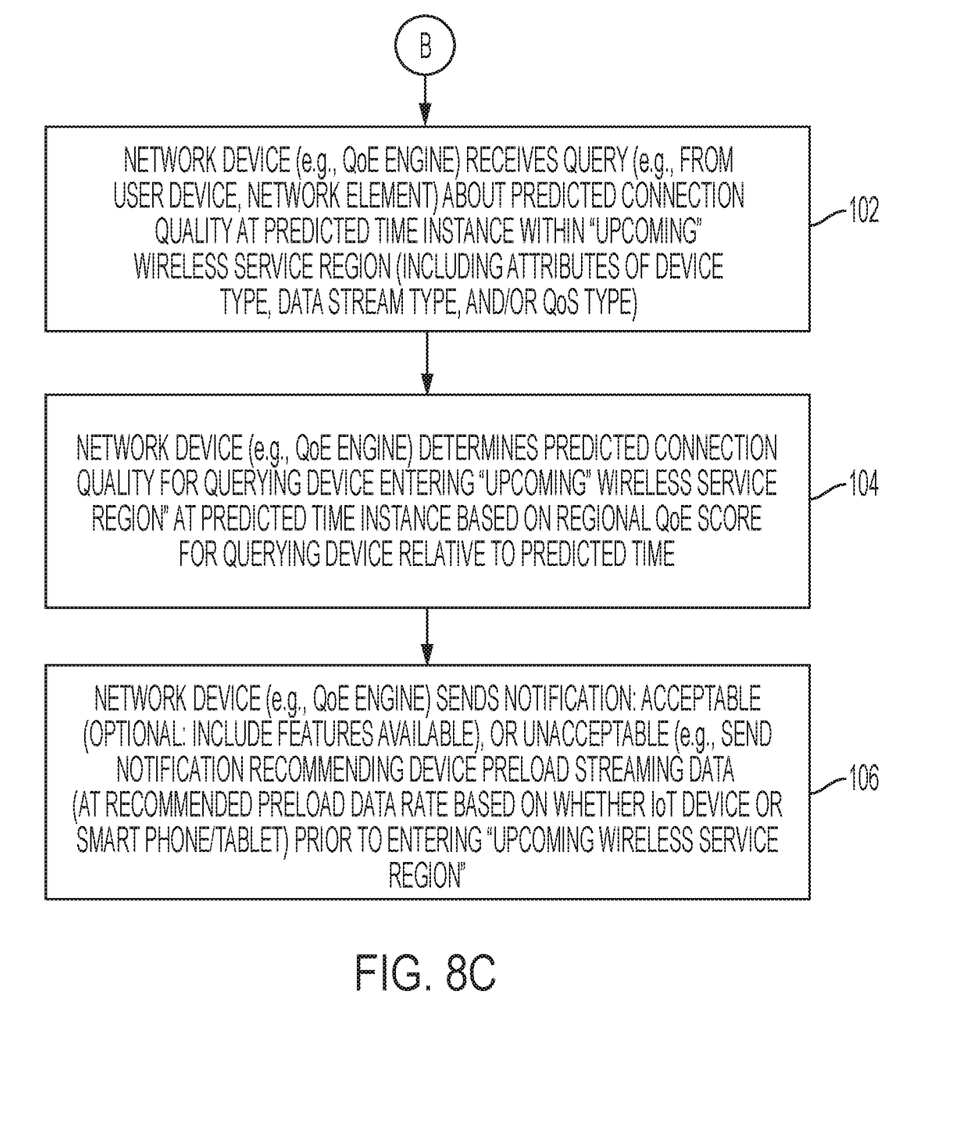

FIGS. 8A-8C illustrate an example method by the apparatus of FIG. 1 of generating location-based wireless connection quality scores for identified wireless regions of a wireless cellular data network, based on determined wireless session interruptions, for mitigation against poor connection quality by mobile network devices prior to entry in an identified wireless region, according to an example embodiment. The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 8A, the device interface circuit 76 and the processor circuit 78 of the data normalizer and sessionizer device 38 and/or the QoE engine device 40 in operation 82 can collect session data from network element devices in the wireless cellular data network 14, including any one or more of the PGW 24, the AAA server device 26, the PCRF device 28, and/or directly from a wireless mobile network device 12. For example, the data normalizer and sessionizer device 38 is configured for monitoring in operation 82 "data feeds" (i.e., data flows) 36 output by any one of the PGW 24, the AAA server device 26, and/or the PCRF device 28, associated with a wireless data session by a wireless mobile network device 12 with any one of the cellular base station 16, the PGW 24, the AAA server device 26, and/or the PCRF device 28. Each wireless mobile network device 12 that initiates a wireless session 54 causes the corresponding PGW 24 to generate and output (e.g., according to UDP protocol), one or more transactional call data records identifying the wireless session 54 of the wireless mobile network device 12, where the UDP-based transactional records can be transmitted (or received by another network device) out of order; the PGW 24 also generates and/or retrieves a transactional call data record from the AAA server device 26 (the AAA server device 26 generates transactional records during the authentication or accounting process of each device session). The PGW 24 also can provide an enhanced data record (EDR) comprising multiple transactional flows corresponding to a device or a set of devices.

Figure 2:
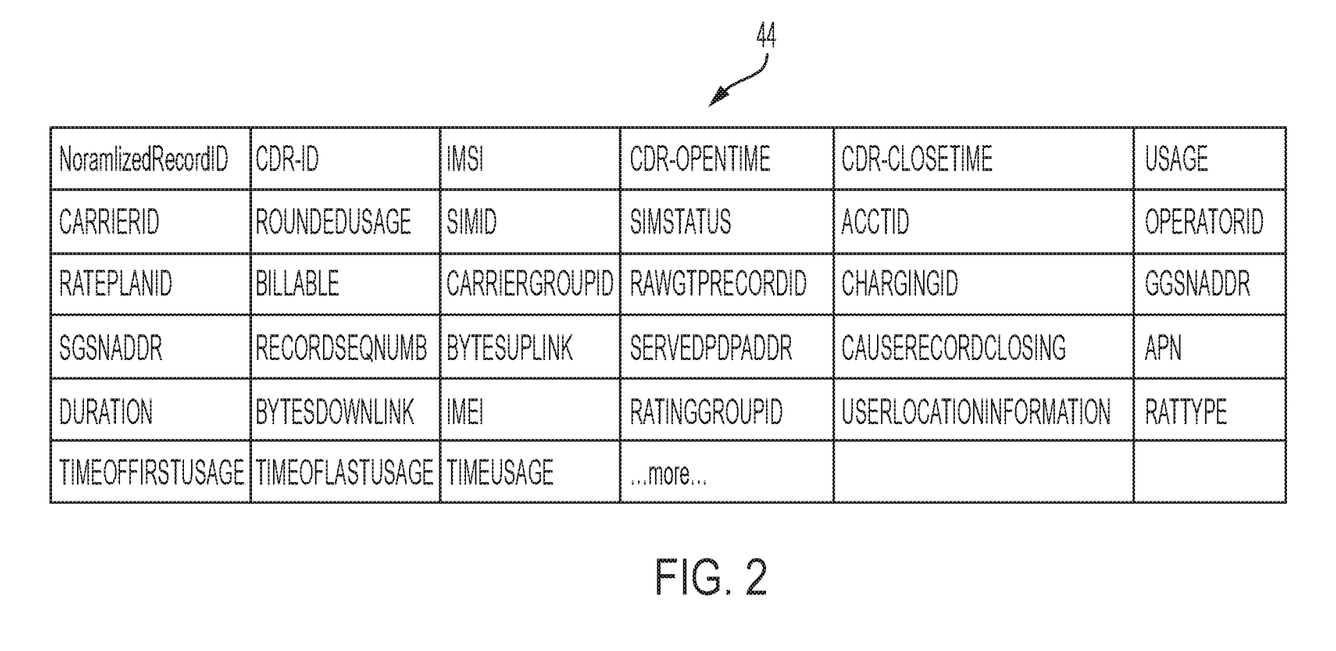
FIG. 2 illustrates an example data structure, generated by the apparatus of FIG. 1, that identifies a wireless session encountering interruption, according to an example embodiment.

The data normalizer and sessionizer device 38 (and/or the QoE engine device 40) in operation 82 can parse the data flows 36 (e.g., the one or more of the transactional call data records and/or the EDRs) received from the PGW 24 and in response can generate in operation 84 a normalized call data record 44, illustrated in FIG. 2, that identifies a corresponding packet data protocol (PDP) based wireless session (54 of FIG. 3) by an identified mobile network device 12. For example, the data normalizer and sessionizer device 38 can collect in operation 82 the UDP-based transactional records output by the PGW 24, identify in operation 84 the UDP-based transactional records associated with a specific wireless mobile network device (e.g., 12a), order into the appropriate sequence in operation 84 the collected UDP-based transactional records for the specific wireless mobile network device (e.g., 12a), and generate in operation 84 the normalized call data record (CDR) 44 that identifies the wireless session 54. As described in detail below, the data normalizer and sessionizer device 38 can identify each wireless session 54 by a session start event and a session termination event. As described below, the processor circuit 78 of the data normalizer and sessionizer device 38 and/or the QoE engine device 40 in operation 88 can "collect" or "aggregate" received data feeds associated with a given wireless sessions 54 (including aggregating a UDP-based transactional indicating an "abnormal" close and/or a "normal" close) until detection of an event that results in a "close" of the wireless sessions 54. Hence, the data normalizer and sessionizer device 38 and/or the QoE engine device 40 can respond to detecting an "abnormal" closing by searching in operation 82 for one or more additional transactional records (output by the PGW) associated with the same wireless mobile network device (e.g., 12a).

As illustrated in FIG. 2, the CDR 44 generated by the processor circuit 78 of the QoE engine device 40 in operation 84 can comprise various attribute fields, including for example: a record identifier ("NormalizedRecordID") that uniquely identifies the CDR 44; a carrier identifier ("CARIERID") that uniquely identifies the wireless cellular data network 14; a rate plan identifier ("RATEPLANID") that identifies the "rate plan" or QoS service level that is allocated to the wireless mobile network device 12; signaling information ("SGSNADDR") such as a signaling gateway address of a serving General Packet Radio Service (GPRS) support node (SGSN) associated with the RAN 18 and/or the PGW 24; an International Mobile Subscriber Identity (IMSI) identifier that uniquely identifies the subscriber of the wireless mobile network device 12; a call data record (CDR) open time ("CDR-OPENTIME") identifying a corresponding time instance that the corresponding wireless network session was started (i.e., opened) as detected by the PGW 24; a CDR close time ("CDR-CLOSETIME") identifying the corresponding time instance that the corresponding wireless network session was ended (i.e., closed) as detected by the data normalizer and sessionizer device 38 and/or the CDR 44; a usage identifier ("USAGE") identifying a number of data bytes that were "used" (i.e., transmitted between the wireless mobile network device 12 and the associated cellular base station 16) during the corresponding wireless session 54 as detected by the PGW 24; and an IP-based Gateway GPRS Support Node (GGSN) address ("GGSNADDR") for the associated PGW 24.

The CDR 44 generated by the processor circuit 78 of the QoE engine device in operation 84 also can comprise: a session closure cause identifier ("CAUSERECORDCLOS- ING") that identifies the corresponding reason that the wireless session 54 was closed.

The CDR 44 can include additional identifiers associated with the wireless mobile network device 12, for example a device identifier ("IMEI"); a bytes received identifier ("BYTESDOWNLINK") identifying data bytes received by the wireless mobile network device 12 during the wireless session 54; a bytes transmitted identifier ("BYTESUPLINK") identifying data bytes transmitted by the wireless mobile network device 12 during the wireless session 54.

As described below, the processor circuit 78 of the QoE engine device 40 in operation 86 can determine that a wireless session 54 can be part of an aggregate wireless session 56 having multiple wireless sessions 54; hence, the data normalizer and sessionizer device 38 (and/or the QoE engine device 40) can insert into each CDR 44 a corresponding sequence identifier ("RECORDSEQNUMBER") (output, for example by the PGW 24 as part of its output data 36): the sequence identifier identifies the relative sequential position of the corresponding CDR 44 relative to other CDRs 44 until detection of a "Normal" session closure cause identifier indicating a closure of the aggregate wireless session 56; as described below, the QoE engine device 40 can determine from the sequence identifier, in combination with the session closure cause identifier ("CAUSERECORDCLOSING"), whether the corresponding wireless session is active or whether the wireless session is no longer active, determined by the QoE engine device 40 to result in a complete closed wireless session comprising one or more wireless sessions 54. As illustrated in FIG. 2, other attributes can be added to the CDR 44.

As described previously, the data normalizer and sessionizer device 38 and/or the QoE engine device 40 can establish, from one or more of the transactional call data records and/or the EDRs, a packet data protocol (PDP) session identified by one or more CDRs 44, where the sequence identifier ("RECORDSEQNUMBER") identifies the relative sequence of the corresponding CDR 44 for a wireless session 54. For example, the PGW 24 can generate multiple transactional call data records during a single wireless data session in cases where the wireless mobile network device 12 has multiple data streams for numerous concurrently-executed application resources ("Apps") (e.g., video streaming, audio streaming, etc. by a wireless mobile network device 12 implemented as a mobile router in a vehicle serving multiple riders; a smart phone device executing numerous data-intensive application resources, etc.); further, the PGW 24 can be configured for setting a prescribed limit (e.g., based on a volume of transmitted data bytes and/or duration such as two hours) for a given transactional call data record, such that the PGW 24 can terminate the transactional call data record if the wireless mobile network device 12 reaches the prescribed limit.

The QoE engine device 40 is configured for identifying in operation 86 whether a given wireless session 54 is still active, or whether the wireless session 54 is no longer active thereby resulting in a complete closed wireless session 54. The session closure cause identifier ("CAUSERECORDCLOSING") can have different output prescribed values according to the GSM Association (GSMA), including "Abnormal" or "Normal". Hence, the QoE engine device 40 is configured for identifying, from a given CDR 44 having a corresponding sequence identifier ("RECORDSEQNUMBER") within the wireless session 54, whether the associated wireless session 54 is still active or has closed ("terminated").

The QoE engine device 40 is configured for identifying in operation 88 whether a wireless session 54 has terminated (e.g., abnormally or normally), and in response the QoE engine device 40 can successively identify the successive wireless sessions 54 as part of the same aggregate wireless session 56, until detection in operation 88 of a "normal" closing (hence, operation 88 includes aggregating, as part of the same aggregate wireless session, a record identifying an abnormal closing). The QoE engine device 40 is configured for repeating the above operations 82, 84, 86, and 88 for each wireless session 54 initiated by a given wireless mobile network device 12, enabling the QoE engine device 40 to establish a sequence of wireless sessions 54 by the wireless mobile network device 12 representing an aggregate wireless session 56 attempted by the wireless mobile network device 12 but interrupted by the abnormal closures in the wireless region 46; the QoE engine device 40 can thus selectively identify successive wireless sessions 54, by the wireless mobile network device 12 in the identified wireless region 46, as part of the aggregate wireless session 56, until detection in operation 90 of the "Normal" closing ("CAUSERECORDCLOSING=Normal") in the corresponding CDR 44 of the wireless mobile network device 12 in the identified wireless region 46.

The QoE engine device 40, in response to determining in operation 90 that a given CDR 44 is the last record for an aggregate wireless session 56, can identify in operation 92 a single unique wireless session for the wireless mobile network device 12 based on identifying the first CDR 44 defining the starting session boundary (specifying "RECORDSEQNUMBER=0"), the last CDR 44 defining the ending session boundary by its sequence identifier and specifying the corresponding session closure cause identifier ("CAUSERECORDCLOSING") specifying either "Abnormal" or "Normal", and assembling (e.g., "stitching") together the sequence of CDRs 44 associated with the wireless sessions 54 based on the respective sequence identifiers ("RECORDSEQNUMBER"), ending with the last CDR 44 specifying the session closure cause identifier ("CAUSERECORDCLOSING") as either "Abnormal" or "Normal".

Referring to FIG. 8B, the processor circuit 78 of the QoE engine device 40 in operation 94 can determine a time gap (e.g., "g1" 58a of FIG. 3) between first and second consecutive wireless sessions (e.g., 54a and 54b of FIG. 3) by a wireless mobile network device 12 in an identified wireless region 46, based on detecting a closing time instance of an abnormal closing of a first wireless session (e.g., 54a) by the wireless mobile network device 12 in the identified wireless region 46, and detecting a corresponding opening time instance of a corresponding opening of the second consecutive wireless session (e.g., 54b) by the wireless mobile network device 12 in the identified wireless region 46. The QoE engine device 40 is configured for applying the time gap, also referred to herein as a "connectivity gap", as a metric for determining a time-based connection quality score for the wireless region 46 having provided the consecutive wireless sessions (e.g., 54 and 54b) to the wireless mobile network device 12. The QoE engine device also can record in a data structure a "normal" close event in response to detecting a normal closing instance of a wireless session for a particular identified location, and optionally the associated enrichment attribute data (e.g., enrichment tags 68), at the particular location: the data structure can be supplied for generation of a connection quality score (CQS 48), described below.

As illustrated in FIG. 3, the QoE engine device 40 in operation 94 can determine (from the corresponding CDR 44) that the wireless session "S1" 54a starts at start time "t1" and ends at time "t2" (defining the session boundaries of the wireless sessions 54a); the QoE engine device 40 also can determine (from the corresponding CDR 44) that the wireless session "S2" 54b starts at start time "t3" and ends at time "t4" (defining the session boundaries of the wireless sessions 54b), etc.

Figure 4:
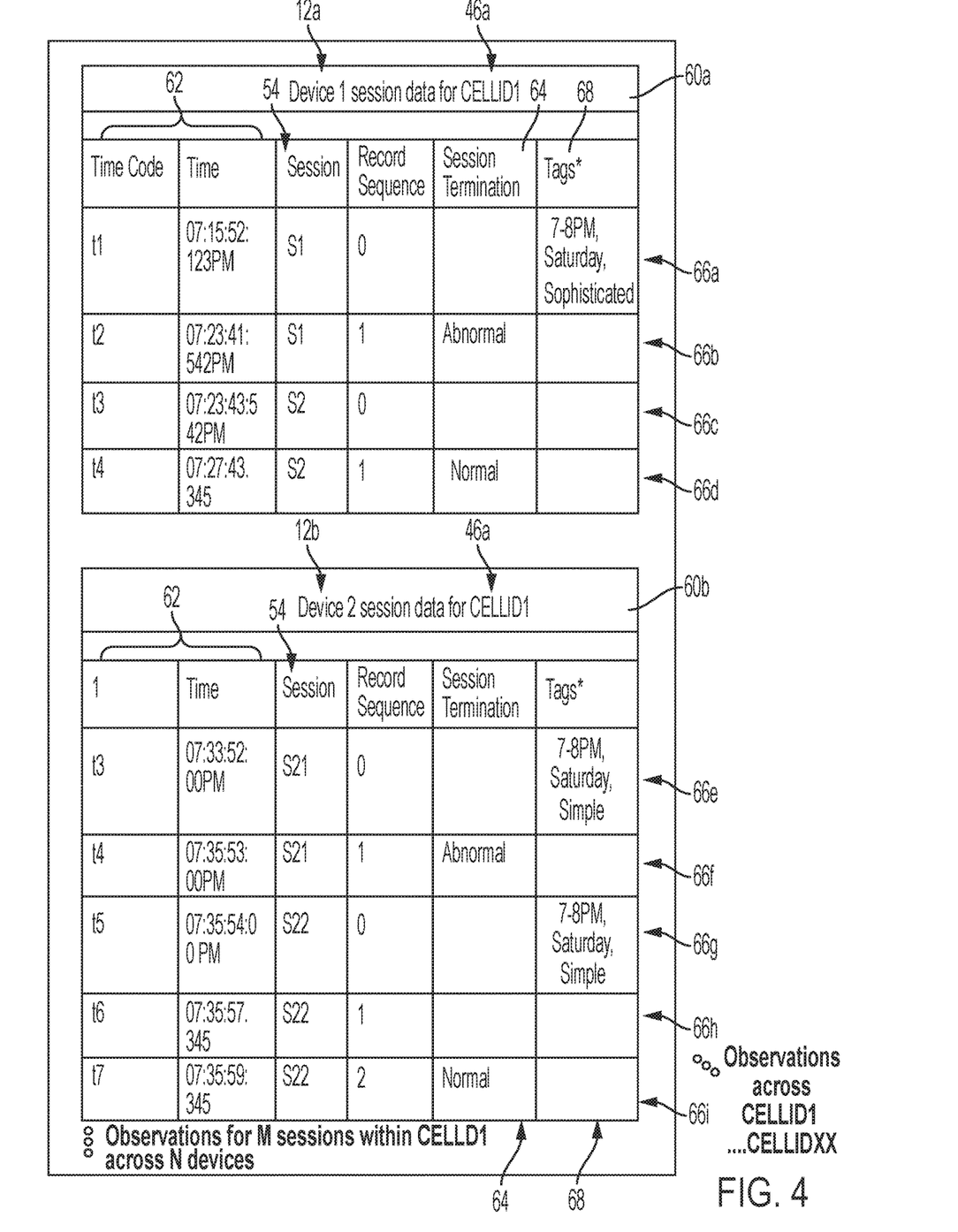
FIG. 4 illustrates an example data structure, generated by the apparatus of FIG. 1, that identifies consecutive wireless sessions associated with an aggregate wireless session by one or more mobile network devices, according to an example embodiment.

The QoE engine device 40 in operation 96 can generate and store in a memory circuit 80, for each wireless mobile network device 12 in a given wireless region 46, a device-cell session data structure 60, illustrated in FIG. 4. The device-cell session data structure 60 identifies the wireless sessions 54 for one or more aggregate wireless sessions 56 and associated time gaps 58 for a given wireless mobile network device 12 in a given wireless region 46.

Each device-cell session data structure 60 illustrates that the QoE engine device 40 can determine (and store in a corresponding device-cell session data structure 60) events and attributes at each time instance 62 (illustrated by time code and corresponding timestamp) within a given wireless sessions 54, including session identifier, sequence identifier ("RECORDSEQNUMBER" in FIG. 2), a session closure cause identifier ("CAUSERECORDCLOSING" in FIG. 2) 64, and other attributes 66 associated with the corresponding time instance 62. Hence, the data normalizer and sessionizer device 38 and/or the QoE engine device 40 can initiate generation of the CDR 44 at time "t1", causing the QoE engine device 40 to generate the entry 66a in response to a transmission by the data normalizer and sessionizer device 38 of an (incomplete) CDR 44 to the QoE engine device 40 (e.g., the data normalizer and sessionizer device 38 can initiate output of the CDR 44 to the QoE engine device 40 in the form of streaming data describing "real-time" attributes (i.e., "context") of the current wireless sessions 54 as detected by the data normalizer and sessionizer device 38); the QoE engine device 40 can generate in operation 96 the entry 66b in response to detecting in the CDR 44 (compiled by the QoE engine device 40 as the "real-time" streaming data is received from the data normalizer and sessionizer device 38) that the session termination type 64 specifies one of an "Abnormal" closure (as in entry 66c) or a "Normal" closure (as in entry 66d). Hence, the QoE engine device 40 can respond to the session termination type 64 identifying closure by causing creation of a new entry 66c for the next CDR 44 associated with a corresponding new wireless sessions 54 starting at the start time "t3".

Figure 6:
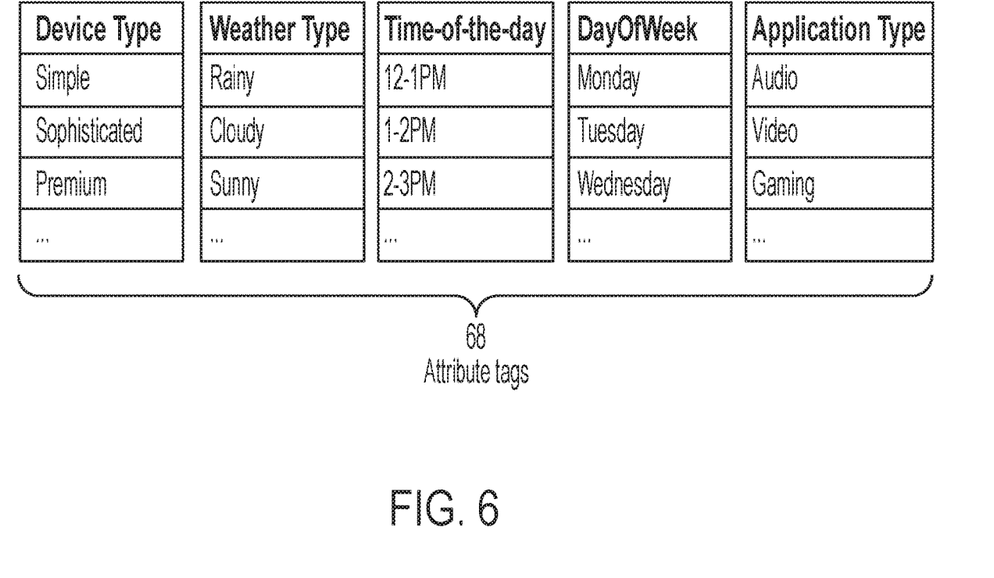
FIG. 6 illustrates example attributes added to the data structures of FIGS. 4 and/or 5, according to an example embodiment.

The QoE engine device 40 also can add in operation 96 "enrichment" tags 68, illustrated in FIG. 6, that describe attributes about any one or more of the wireless mobile network device 12, the wireless cellular data network 14, the corresponding wireless region 46, or the wireless sessions 54. For example, the QoE engine device 40 can add enrichment tags 68 to the entry 66a specifying tags associated with the wireless sessions 54a occurring at an identifiable time event (e.g., a meeting event, network traffic alerts or attributes encountered in the wireless region 46, vehicular traffic information or social event information associated with the current location of the wireless mobile network device 12, GPS coordinates, application type metadata describing the executable application consuming the wireless data during the current wireless sessions 54, etc.), and that the wireless mobile network device 12 is a "sophisticated" device such as a 4G/5G smart phone (e.g., for purposes of time stamp resolution in the wireless mobile network device 12, device processing capacity, etc.). Hence, the QoE engine device 40 can generate session gap inference record 70a that provides a "context" for the time gap 58a detected for the wireless mobile network device 12a.

In contrast, the device-cell session data structure 60b illustrates that QoE engine device 40 determines that the wireless mobile network device 12b (in the entry 66e) is a "simple" device (e.g., a resource-constrained Internet of Things (IoT) device) having constrained processing capacity, reduced-resolution system clock, limited power capacity, etc. Hence, the corresponding session gap inference record 70b generated by the QoE engine device 40 for the wireless mobile network device 12b (based on the associated entries 66e through 66i) can identify the context for the time gap 58b detected for the wireless mobile network device 12b, including the enrichment tags 68 such as time interval, day of week, etc. Other session gap inference records 70 (e.g., 70c) can be generated for other devices (e.g., 12c) within the same wireless region 46a, and aggregated with other session gap inference records 70 associated within different wireless regions 46 (e.g., 46c) throughout the wireless cellular data network 14.

Figure 5:
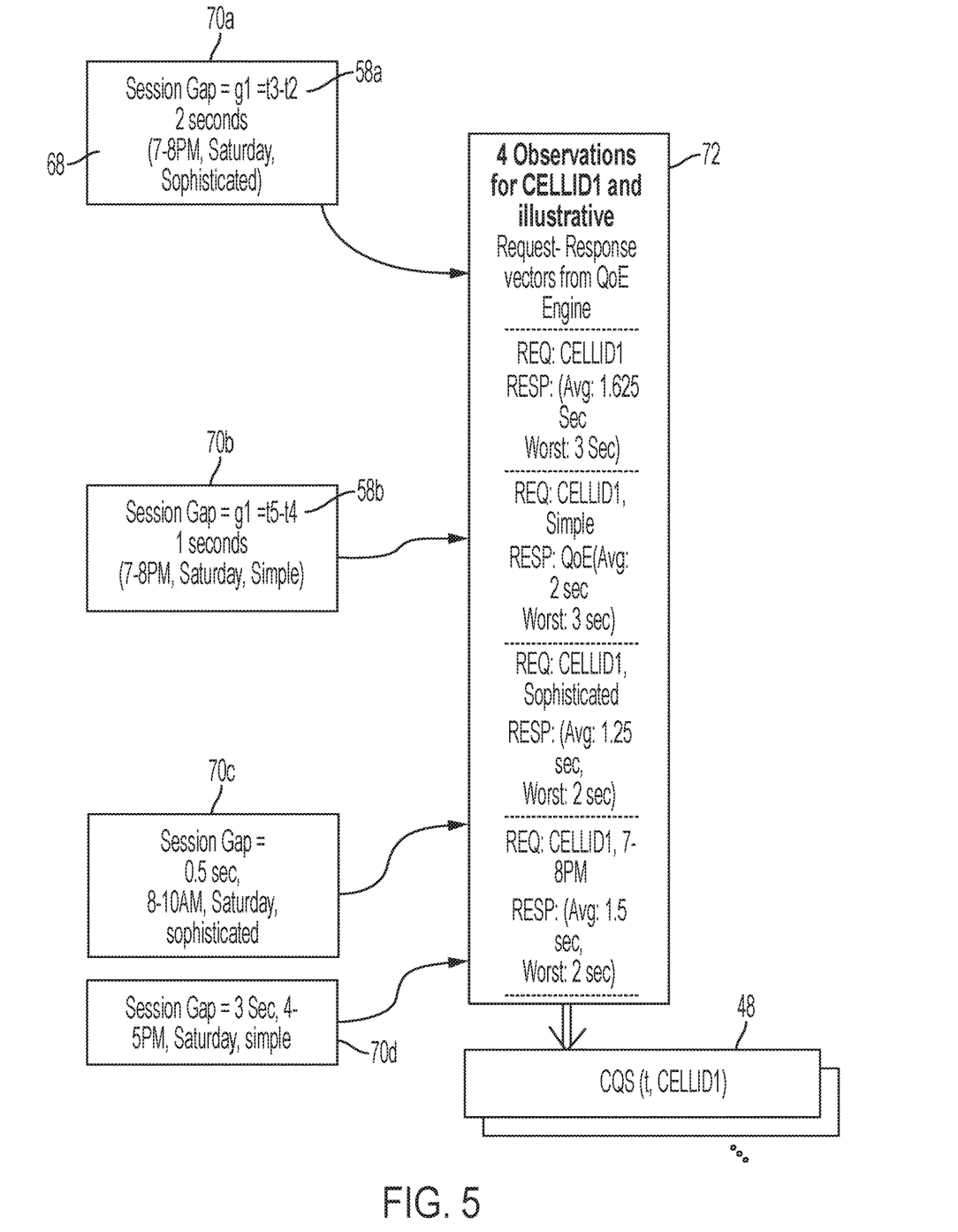
FIG. 5 illustrates example data structures, generated by the apparatus of FIG. 1, that identify context-based aggregation of time gaps caused by respective wireless session interruptions by one or more wireless network devices in an identified wireless region for generation of time-based connection-quality score (CQS), according to an example embodiment.

Hence, the processor circuit 78 of the QoE engine device 40 in operation 98 can aggregate the time gaps 58 as illustrated in the session gap inference records 70 associated within a particular wireless region 46, illustrated as an aggregated data record 72 for the wireless region 46 that can be stored and updated in the location-based QoE database 50. As illustrated in FIG. 5, the aggregated data record 72 (and the associated session gap inference records 70) can include other relevant attributes, for example average and worst-case response times 74 between a request from a wireless mobile network device 12 and a response from the corresponding cellular base station 16 in the wireless region 46. The information collected in the location-based QoE database 50 can be used for statistical analysis (median, mean, standard deviation), modeling (trend analysis, etc.), etc.

Hence, the processor circuit 78 of the QoE engine device 40 in operation 100 can generate and store, based on the above-described information (including the CDRs 44, the time gaps 58, the device-cell session data structures 60, the session gap inference records 70, and the aggregated data records 72) a time-based (i.e., variable as a function of time) connection quality score (CQS) 48 for the wireless region 46 and that can be stored and updated in the location-based QoE database 50 or other storage location. In one example, the time-based connection quality score (also referred to as a "Quality of Experience" (QoE) score) 46 can be implemented as a multi-dimensional vector (e.g., a multi-dimensional probability distribution function) based on the above-described attributes, including the enrichment tags 68, etc.; the QoE score 46 also can be expressed using a linear scale of 1 (worst) to 10 (best) for a single dimensional expression, as appropriate, etc.

The QoE engine device 40 is configured for determining, from the CDR 44, and other data sources (described below) particular characteristics associated with each of wireless sessions 54: example characteristics determined for each wireless session 54 include how each session is opened (i.e., initiated) or closed (i.e., terminated), the device type (manufacturer, model, wireless data protocol in use, etc.), weather conditions during the wireless session 54, device application type that utilized the wireless session 54 (e.g., streaming media application, web browser application, voice call application, cloud-based synchronization application, texting application, etc.)

The QoE engine device 40 is configured for mining the particular characteristics from the various data sources in order to generate inferences that associate attributes in the wireless mobile network device 12 and/or the wireless cellular data network 14 with the wireless sessions 54 identified by the CDRs 44, including predicted network traffic load conditions, predicted number of wireless mobile network devices 12 in a given wireless region 46 at a predicted time, the predicted aggregate bandwidth and Quality of Service (QoS) requirements of the predicted wireless mobile network devices 12 in the given wireless region 46 at the predicted time, etc.

Hence, the QoE engine device 40 is configured for generating in operation 100 the time-based connection-quality score (CQS) (48 of FIG. 5) for each wireless region 46 based on the inferences associated with the wireless mobile network devices 12 and/or the wireless cellular data network 14 at the associated wireless regions 46, and storing the time-based CQS 48 for the corresponding wireless region 46 in the location-based Quality of Experience (QoE) database 50.

Referring to FIG. 8C, the connection quality server device 30 (e.g., the QoE engine device 40) in operation 102 can receive a query from a wireless mobile network device 12 (e.g., 12a in communication via the wireless region 46a), or another network device acting as a proxy on behalf of the wireless mobile network device 12 (e.g., the PGW 24): the query can request information about a predicted connection quality at a predicted time instance that the wireless mobile network device 12 "intends" to enter into an "upcoming" wireless region 46b.

The connection quality server device 30 can be advertised by the wireless cellular data network 14 (e.g., based on exposing an Application Programming Interface (API)) to the wireless mobile network devices 12, enabling each of the wireless mobile network devices 12 (or any other network device in the wireless cellular data network 14 acting as a proxy device on behalf of the wireless mobile network device 12) to initiate communications with the connection quality server device 30 by sending a query about predicted connection quality for an identified wireless region 46, enabling the querying wireless mobile network device 12 to determine whether it needs to mitigate against poor connection quality prior to entering the wireless region 46.

As described below, any one of the wireless mobile network devices 12 can send a query to the connection quality server device 30 about predicted connection quality to determine whether an identified wireless region 46 (identified, for example, by "cell ID") has a sufficient connection quality, at a predicted time instance corresponding to a predicted entry into the wireless region 46b, to satisfy predicted ("intent-based") data requirements at the predicted time instance; for example, a wireless mobile network device 12a may request a recommendation whether an identified wireless region 46 is predicted to have sufficient connection quality at a predicted time instance that the wireless mobile network device 12 enters the wireless region 46 for a video streaming application to be executed by the wireless mobile network device 12 in the wireless region 46 at the predicted time instance. The query can include relevant attributes such as device type, data stream type, QoS type, etc.

The processor circuit 78 of the QoE engine device 40 in operation 104 can determine, based on accessing the time-based CQS 48 from the location-based QoE database 50 and correlating the time-based CQS 48 relative to the attributes of the requesting wireless mobile network device 12 and the associated QoS requirements at the predicted time instance in the wireless region 46, whether the wireless region 46 is predicted to provide sufficient connection quality for the associated QoS requirements, or whether the wireless region 46 is predicted to provide poor connection quality that is insufficient for the QoS requirements required by the requesting wireless mobile network device 12.

The QoE engine device 40 of the connection quality server device 30 can generate and send in operation 106 a notification to the wireless mobile network device 12a indicating whether the wireless region 46b is predicted to provide sufficient connection quality at the predicted time instance, or a notification indicating the wireless region 46 is predicted to provide poor connection quality that is insufficient for the QoS requirements at the predicted time instance. The QoE engine device 40 also can include with the notification of poor connection quality an instruction to preload streaming data from another wireless region 46 O (e.g., 46a) in the wireless cellular data network 14, prior to entry in the identified wireless region 46b at the predicted time instance; the instruction can include a recommendation for the wireless mobile network device 12 to preload the streaming data at an identified data rate, for example based on the determined device performance requirements of the wireless mobile network device 12 relative to the predicted connection quality.

Hence, the instruction from the QoE engine device 40 can cause the wireless mobile network device 12 to mitigate against the poor connection quality in the wireless region 46b, prior to entry of the wireless mobile network device 12 into the wireless region 46b, based on preloading via the wireless region 46a at least a portion of the streaming data required to maintain the QoS requirements as the requesting wireless mobile network device 12 travels through the wireless region 46b.

According to example embodiments, time gaps are identified between consecutive wireless sessions by a mobile network device in an identified wireless region of a wireless cellular data network, for generation of a time-based connection quality score for the identified wireless region that enables predictive mitigation against poor connection quality prior to a mobile network device entering the identified wireless region. The time-based connection quality score can be queried by device applications and can thus provide optimal customer experience/QoE for streaming content based on a variety of intent parameters, including for example weather, location, device type/make/model, road traffic data and typical application types.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:
1. A method comprising:
   determining, by a network device, a time gap between first and second wireless sessions by a mobile network device in an identified wireless region of a wireless cellular data network, the time gap determined based on first detecting an abnormal closing of the first wireless session based on a first call data record (CDR) generated based on data from a packet gateway (PGW) associated with the wireless cellular data network, and second detecting an opening of the second wireless session consecutively following the first wireless session based on a second CDR generated based on data from the PGW;
aggregating, by the network device, a plurality of the time gaps for respective first and second wireless sessions by one or more of the mobile network devices in the identified wireless region;
generating and storing, by the network device, a time-based connection quality score for the identified wireless region based on the time gaps; and
causing, by the network device, a second mobile network device destined for the identified wireless region to mitigate against poor connection quality in the identified wireless region based on the time-based connection quality score and prior to entry of the second mobile network device into the identified wireless region.

2. The method of claim 1, wherein the causing includes:
receiving, from the second mobile network device, a query about predicted connection quality in the identified wireless region at a predicted time instance; and
generating and sending to the second mobile network device a notification indicating the poor connection quality based on the time-based connection quality score relative to the predicted time instance, the notification causing the second mobile network device to preload streaming media data from the wireless cellular data network prior to entry into the identified wireless region.

3. The method of claim 2, wherein:
the aggregating includes correlating the time gaps among the mobile network devices based on device type for identification of a corresponding time gap resolution;
the query identifies the corresponding device type of the second mobile network device for identification of corresponding device performance requirements; and
the notification is based on the corresponding device performance requirements of the second mobile network device relative to the predicted connection quality.

4. The method of claim 2, wherein the notification includes a recommendation for the second network device to preload the streaming data at an identified data rate, based on determined device performance requirements of the second mobile network device relative to the predicted connection quality.

5. The method of claim 1, wherein the determining includes identifying the first wireless session and the second wireless session as part of an aggregate wireless session attempted by the mobile network device but interrupted by at least the abnormal closing.

6. The method of claim 5, wherein the determining further comprises selectively identifying successive wireless sessions, by the mobile network device in the identified wireless region, as part of the aggregate wireless session, until detection of a normal closing in a corresponding CDR of the mobile network device in the identified wireless region.

7. The method of claim 1, wherein the determining includes identifying session boundaries for each of the first and second wireless sessions for generation of the respective first and second CDRs.

8. An apparatus implemented as a physical machine, the apparatus comprising:
non-transitory machine readable media configured for storing executable machine readable code;
a device interface circuit configured for retrieving data from a packet gateway (PGW) associated with a wireless cellular data network; and
a processor circuit configured for executing the machine readable code, and when executing the machine readable code operable for:
determining a time gap between first and second wireless sessions by a mobile network device in an identified wireless region of a wireless cellular data network, the time gap determined based on first detecting an abnormal closing of the first wireless session based on a first call data record (CDR) generated based on data from the PGW, and second detecting an opening of the second wireless session consecutively following the first wireless session based on a second CDR generated based on data from the PGW,
aggregating a plurality of the time gaps for respective first and second wireless sessions by one or more of the mobile network devices in the identified wireless region,
generating and storing a time-based connection quality score for the identified wireless region based on the time gaps, and
causing a second mobile network device destined for the identified wireless region to mitigate against poor connection quality in the identified wireless region based on the time-based connection quality score and prior to entry of the second mobile network device into the identified wireless region.

9. The apparatus of claim 8, wherein the causing includes:
receiving, from the second mobile network device, a query about predicted connection quality in the identified wireless region at a predicted time instance; and
generating and sending to the second mobile network device a notification indicating the poor connection quality based on the time-based connection quality score relative to the predicted time instance, the notification causing the second mobile network device to preload streaming media data from the wireless cellular data network prior to entry into the identified wireless region.

10. The apparatus of claim 9, wherein:
the aggregating includes correlating the time gaps among the mobile network devices based on device type for identification of a corresponding time gap resolution;
the query identifies the corresponding device type of the second mobile network device for identification of corresponding device performance requirements; and
the notification is based on the corresponding device performance requirements of the second mobile network device relative to the predicted connection quality.

11. The apparatus of claim 9, wherein the notification includes a recommendation for the second network device to preload the streaming data at an identified data rate, based on determined device performance requirements of the second mobile network device relative to the predicted connection quality.

12. The apparatus of claim 8, wherein the determining includes identifying the first wireless session and the second wireless session as part of an aggregate wireless session attempted by the mobile network device but interrupted by at least the abnormal closing.

13. The apparatus of claim 12, wherein the determining further comprises selectively identifying successive wireless sessions, by the mobile network device in the identified wireless region, as part of the aggregate wireless session, until detection of a normal closing in a corresponding CDR of the mobile network device in the identified wireless region.

14. The apparatus of claim 8, wherein the determining includes identifying session boundaries for each of the first and second wireless sessions for generation of the respective first and second CDRs.

15. One or more non-transitory tangible media encoded with logic for execution by a machine and when executed by the machine operable for:

determining, by the machine implemented as a network device, a time gap between first and second wireless sessions by a mobile network device in an identified wireless region of a wireless cellular data network, the time gap determined based on first detecting an abnormal closing of the first wireless session based on a first call data record (CDR) generated based on data from a packet gateway (PGW) associated with the wireless cellular data network, and second detecting an opening of the second wireless session consecutively following the first wireless session based on a second CDR generated based on data from the PGW;

aggregating, by the network device, a plurality of the time gaps for respective first and second wireless sessions by one or more of the mobile network devices in the identified wireless region;

generating and storing, by the network device, a time-based connection quality score for the identified wireless region based on the time gaps; and causing, by the network device, a second mobile network device destined for the identified wireless region to mitigate against poor connection quality in the identified wireless region based on the time-based connection quality score and prior to entry of the second mobile network device into the identified wireless region.

16. The one or more non-transitory tangible media of claim 15, wherein the causing includes:

receiving, from the second mobile network device, a query about predicted connection quality in the identified wireless region at a predicted time instance; and generating and sending to the second mobile network device a notification indicating the poor connection quality based on the time-based connection quality score relative to the predicted time instance, the notification causing the second mobile network device to preload streaming media data from the wireless cellular data network prior to entry into the identified wireless region.

17. The one or more non-transitory tangible media of claim 16, wherein:

the aggregating includes correlating the time gaps among the mobile network devices based on device type for identification of a corresponding time gap resolution;

the query identifies the corresponding device type of the second mobile network device for identification of corresponding device performance requirements; and the notification is based on the corresponding device performance requirements of the second mobile network device relative to the predicted connection quality.

18. The one or more non-transitory tangible media of claim 16, wherein the notification includes a recommendation for the second network device to preload the streaming data at an identified data rate, based on determined device performance requirements of the second mobile network device relative to the predicted connection quality.

19. The one or more non-transitory tangible media of claim 15, wherein the determining includes identifying the first wireless session and the second wireless session as part of an aggregate wireless session attempted by the mobile network device but interrupted by at least the abnormal closing.

20. The one or more non-transitory tangible media of claim 15, wherein the determining further comprises selectively identifying successive wireless sessions, by the mobile network device in the identified wireless region, as part of the aggregate wireless session, until detection of a normal closing in a corresponding CDR of the mobile network device in the identified wireless region.

* * * * *